United States Patent
Boillot et al.

[11] Patent Number: 5,612,785
[45] Date of Patent: Mar. 18, 1997

[54] TWIN SENSOR LASER PROBE

[75] Inventors: Jean-Paul Boillot, Saint-Bruno de Montarville; Pierre Provencher, Montréal; Denis Villemure, Longueuil, all of Canada

[73] Assignee: Servo Robot Inc., Québec, Canada

[21] Appl. No.: 582,500

[22] Filed: Jan. 3, 1996

[51] Int. Cl.⁶ .............................. G01B 11/14; G01B 11/24
[52] U.S. Cl. .............................................. 356/375; 356/376
[58] Field of Search ...................................... 356/375, 376

[56] References Cited

U.S. PATENT DOCUMENTS

| | | | |
|---|---|---|---|
| 4,166,941 | 9/1979 | Cecil | 219/124.34 |
| 4,283,617 | 8/1981 | Merrick et al. | 219/125.1 |
| 4,355,904 | 10/1982 | Balasubramanian | 356/376 |
| 4,389,561 | 6/1983 | Weman et al. | 219/124.34 |
| 4,477,712 | 10/1984 | Lillquist et al. | 219/124.34 |
| 4,590,356 | 5/1986 | Povlick et al. | 219/124.34 |
| 4,667,082 | 5/1987 | Shibata et al. | 219/124.34 |
| 4,711,578 | 12/1987 | Chaimowicz | 356/375 |
| 4,734,766 | 3/1988 | Shiozumi et al. | 358/106 |
| 4,812,614 | 3/1989 | Wang et al. | 219/124.34 |
| 4,831,233 | 5/1989 | Gordon | 219/124.34 |
| 4,916,286 | 4/1990 | Sarugaku et al. | 219/124.34 |
| 5,071,252 | 12/1991 | Matsuura | 356/376 |
| 5,264,678 | 11/1993 | Powell et al. | 219/130.01 |
| 5,275,327 | 1/1994 | Watkins et al. | 228/102 |
| 5,311,288 | 5/1994 | Shahar | 356/376 |
| 5,406,372 | 4/1995 | Vodanovic et al. | 356/394 |

FOREIGN PATENT DOCUMENTS

| | | |
|---|---|---|
| 387521 | 9/1990 | European Pat. Off. . |
| 442393 | 8/1991 | European Pat. Off. . |
| 4025682 | 2/1992 | Germany . |
| 55-149789 | 11/1980 | Japan . |
| 2300613 | 12/1990 | Japan . |
| 332470 | 2/1991 | Japan . |
| 599661 | 4/1993 | Japan . |
| 2157851 | 10/1985 | United Kingdom . |
| 9005279 | 5/1990 | WIPO . |

Primary Examiner—Frank Gonzalez
Assistant Examiner—Amanda Merlino
Attorney, Agent, or Firm—McDermott, Will & Emery

[57] ABSTRACT

The twin sensor laser probe and the method are for absolute depth measurement of two distinct points on an object surface. Two light beams emitted by a light source are directed toward the object surface at acute angles relative thereto, to illuminate two distinct points of the object surface having positions depending on depth thereof. The light beams extend on opposite sides of a plane separating the probe in two longitudinal portions and intersecting the object surface. Two optical sensors are positioned above the object surface and extend on the opposite sides of the plane respectively. The two illuminated points are imaged on the sensors by a lens and two parallel mirrors optically arranged to fold the fields of view of the optical sensors. The signals produced by the sensors provide information for the absolute depth measurement of the two points.

7 Claims, 4 Drawing Sheets

TWIN SENSOR LASER PROBE

FIELD OF THE INVENTION

The invention generally relates to an optical probe device and more particularly to a twin sensor laser probe for absolute depth measurement of two distinct points on an object surface, and a probe method for the same. The probe and the method are particularly useful for seam tracking in welding processes, although they can be used for many other purposes as well.

1. Description of Related Art

Generally, seam tracking is carried out using a mechanical probe having a small tip that touches the joint (e.g. V groove, corner or fillet joint) to sense its position. The tip activates a switch that transmits a "direction" signal to a positioning device assisting the welding torch. So the probe, by touching the lateral walls of the joint, will continuously transmit the "direction" signal to the positioning device to make it move laterally to the right or the left, or vertically up or down, in order to maintain the welding torch (and the tip of the probe) in the center of the joint.

One problem with the mechanical probe is that it must touch the workpiece to sense its position and the bottom of the joint can contain some defects where the tip of the probe gets stuck. The lifetime of the mechanical probe is also shortened by friction and shocks. Furthermore, heavy metallic hot spatters produced by the welding torch may fly on the tip of the mechanical probe and damage it rapidly.

Another problem with most mechanical probes is that the "direction" signal produced by the tip switch provides limited tracking information and is generally not proportional to the position error, i.e. it is only an "ON/OFF" type of signal. Furthermore, a mechanical probe does not provide any information on the lateral angle of the joint that is being tracked.

Of interest, EP patent application Ser. No. 0,387,521 (Schneider et al.) published on Sep. 19, 1990 describes an optical distance sensor using a triangulation method. An objective lens, hollow mirror and pyramid mirror arrangement directs the light beam reflected by a single illuminated point on an object toward two spaced photo detectors positioned symmetrically with respect to an optical axis of the sensor.

U.S. Pat. No. 5,071,252 (Matsuura) describes a method for contactless profiling normal to a surface. The method consists in directing three laser beams toward the target surface to measure the distance at which lays each of the illuminated points by triangulation.

Also of interest are: U.S. Pat. Nos. 4,116,941 (Cecil); 4,283,617 (Merrick et al.); 4,355,904 (Balasubramanian); 4,389,561 (Weman et al.); 4,477,712 (Lillquist et al.); 4,590,356 (Povlick et al.); 4,667,082 (Shibata et al.); 4,734,766 (Shiozumi et al.); 4,812,614 (Wang et al.); 4,831,233 (Gordon); 4,916,286 (Sarugaku et al.); 5,264,678 (Powell et al.); 5,275,327 (Watkins et al.); 5,406,372 (Vodanovic et al.); DE patent No. 4,025,682 (Moll et al.); JP patent Nos. 55-149789 (Takashima); 2-300613 (Sugiyama); 3-32470 (Iida); 5-99661 (Yunaka); EP patent application No. 0,442,393 (Katogh et al.) published on Aug. 21, 1991; PCT patent application No. WO 90/05279 (Rathjen et al.) published on May 17, 1990; and UK patent application No. 2,157,851 (Lucas et al.) published on Oct. 20, 1985.

However, the above-mentioned patent documents all provide devices which are unsatisfactory for the purpose of seam tracking in a welding process (or other tasks involving the absolute depth measurement of two distinct points on an object surface), because they all either lack an essential feature for such a purpose or are too complex and/or cumbersome.

2. Object of the Invention

It is therefore an object of the present invention to provide a simple yet effective probe and a method for absolute depth measurement of two distinct points on an object surface, which allows the calculation of the angle and distance of the object surface to the probe.

It is another object of the invention to provide such a probe and a method for advantageous replacement of mechanical probes for seam tracking in a welding process.

SUMMARY OF THE INVENTION

According to the present invention, there is provided a twin sensor laser probe for absolute depth measurement of two distinct points on an object surface, comprising:

a light source means for emitting two light beams directed toward the object surface at acute angles relative thereto, to illuminate two distinct points on the object surface having positions depending on depth thereof, the light beams extending on opposite sides of a plane separating the probe in two longitudinal portions and intersecting the object surface;

two optical sensors positioned above the object surface and extending on the opposite sides of the plane respectively, each of the sensors having a photo-sensitive surface aligned to receive light derived from a corresponding one of the two illuminated points, and an output for producing a signal indicating where the light strikes on the sensitive surface;

lens means positioned between the two sensors and the object surface, for imaging the two illuminated points onto the sensitive surfaces of the sensors respectively, at positions in relation to the positions of the illuminated points on the object surface, the lens means having a focal length substantially coinciding with the object surface where the light beams are susceptible to strike thereon; and two mirrors positioned between the lens means and the object surface, and extending on the opposite sides of the plane respectively, each of the mirrors being oriented to receive the light derived from the illuminated point on the opposite side of the plane and to reflect the light towards the sensitive surface of the sensor on the opposite side of the plane via the lens means;

whereby the signals produced by the sensors provide information for the absolute depth measurement of the two points.

Preferably, the light source means comprises a laser for producing a spreading laser beam that provides the two light beams.

According to the invention, there is also provided a probe method for absolute depth measurement of two distinct points on an object surface, comprising the steps of:

emitting two light beams directed toward the object surface at acute angles relative thereto, to illuminate two distinct points on the object surface having positions depending on depth thereof, the light beams extending on opposite sides of a plane separating an optical sensing path in two longitudinal portions and intersecting the object surface;

positioning two optical sensors above the object surface, the sensors extending on the opposite sides of the plane respectively, each of the sensors having a photo-sensitive surface aligned to receive light derived from a corresponding one of the two illuminated points, and an output for producing a signal indicating where the light strikes on the sensitive surface;

positioning lens means between the two sensors and the object surface, for imaging the two illuminated points onto the sensitive surfaces of the sensors respectively, at positions in relation to the positions of the illuminated points on the object surface, the lens means having a focal length substantially coinciding with the object surface where the light beams are susceptible to strike thereon; and positioning two mirrors between the lens means and the object surface, the mirrors extending on the opposite sides of the plane respectively, each of the mirrors being oriented to receive the light derived from the illuminated point on the opposite side of the plane and to reflect the light towards the sensitive surface of the sensor on the opposite side of the plane via the lens means;

whereby the signals produced by the sensors provide information for the absolute depth measurement of the two points.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DESCRIPTION OF THE PREFERRED EMBODIMENT(S)

Figure 1:
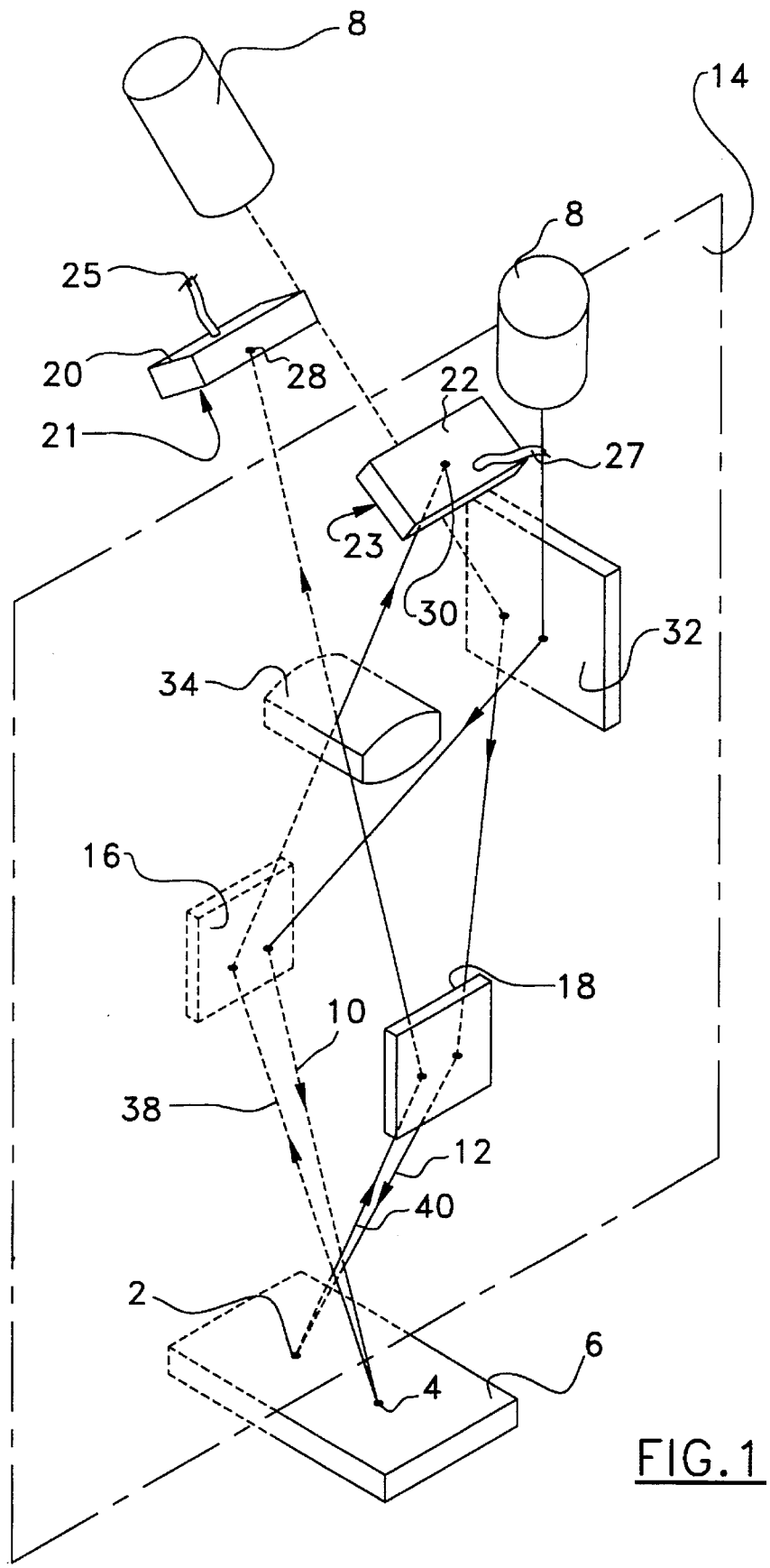
FIG. 1 is a perspective schematic diagram view of a twin sensor laser probe according to the present invention; using two laser sources.

In the following description and in the drawings, like reference characters refer to like or corresponding parts throughout the several views.

Referring to FIG. 1, there is shown a twin sensor laser probe for absolute depth measurement of two distinct points 2, 4 on an object surface 6. Two light sources 8 are used for emitting two light beams 10, 12 directed toward the object surface 6 at acute angles relative thereto, to illuminate two distinct points 2, 4 on the object surface 6 having positions depending on depth thereof. The light beams 10, 12 extend on opposite sides of a plane 14 that separates the probe (or the probe optical sensing path) in two longitudinal portions and intersects the object surface 6. Two optical sensors 20, 22 are positioned above the object surface 6 and extend on the opposite sides of the plane 14 respectively. Each of the sensors 20, 22 has a photo-sensitive surface 21, 23 aligned to receive light diffused from a corresponding one of the two illuminated points 2, 4, and an output 25, 27 for producing a signal indicating where the light strikes on the sensitive surface 21, 23. A lens 34 is positioned between the two sensors 20, 22 and the object surface 6, for imaging the two illuminated points 2, 4 onto the sensitive surfaces 21, 23 of the sensors 20, 22 respectively, at positions in relation to the positions of the illuminated points 2, 4 on the object surface 6. The lens 34 has a focal length substantially coinciding with the object surface 6 where the light beams 10, 12 are susceptible to strike thereon. Two mirrors 16, 18 are positioned between the lens 34 and the object surface 6, and extend on the opposite sides of the plane 14 respectively. Each of the mirrors 16, 18 is oriented to receive the light diffused from the illuminated point 2, 4 on the opposite side of the plane 14 and to reflect the light towards the sensitive surface 21, 23 of the sensor 20, 22 on the opposite side of the plane 14 via the lens 34. The signals produced by the sensors 20, 22 provide information for the absolute depth measurement of the two points 2, 4, as it will become more apparent from the following.

Figure 2:
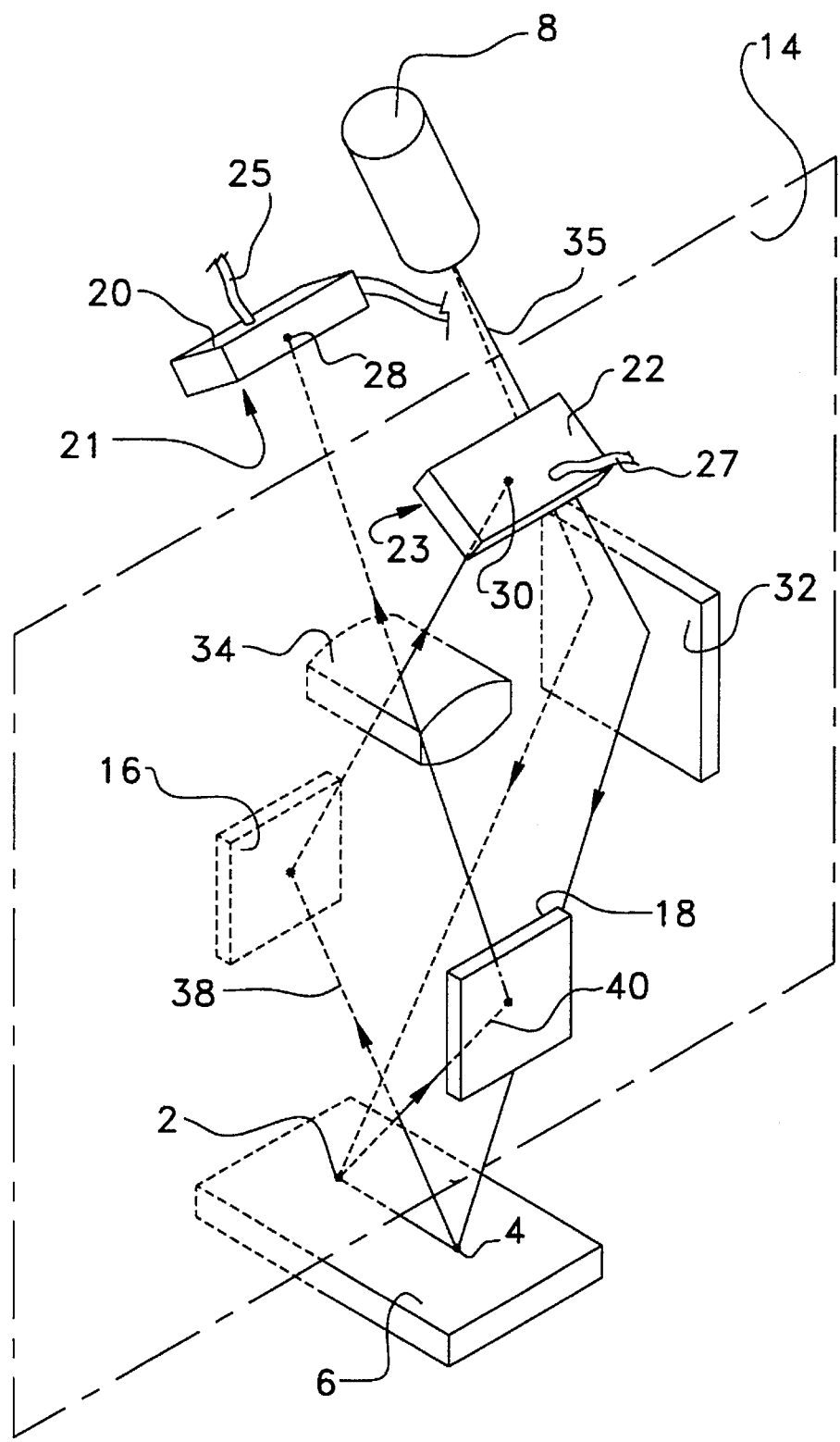
FIG. 2 is a perspective schematic diagram view of a twin sensor laser probe according to the invention, using one laser source.

Referring to FIG. 2, there is shown a twin sensor laser probe having in this case a single light source 8 emitting a spreading laser beam 35 producing a laser line on the object surface 6, by means of which the two points 2, 4 are illuminated.

Figure 3:
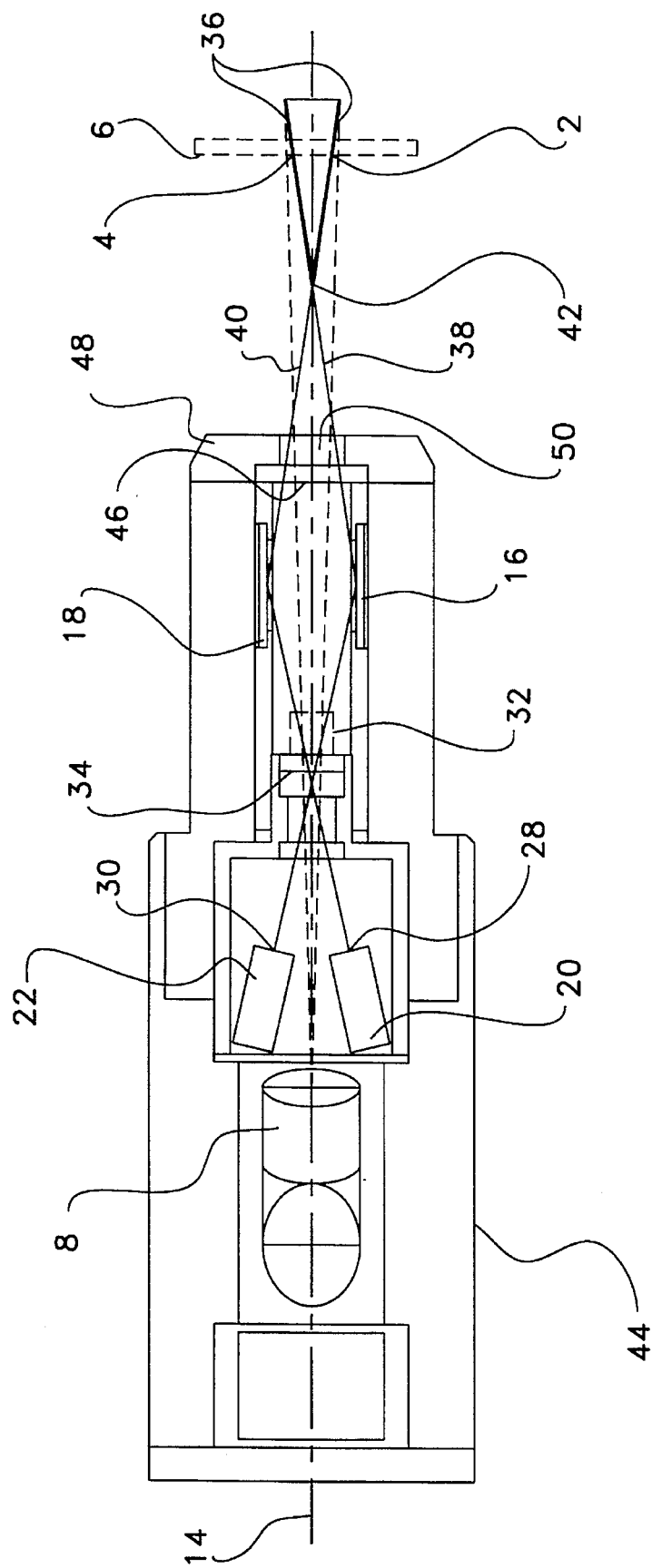
FIGS. 3 and 4 are top and side schematic diagram views of a twin sensor laser probe according to the invention.
Figure 4:
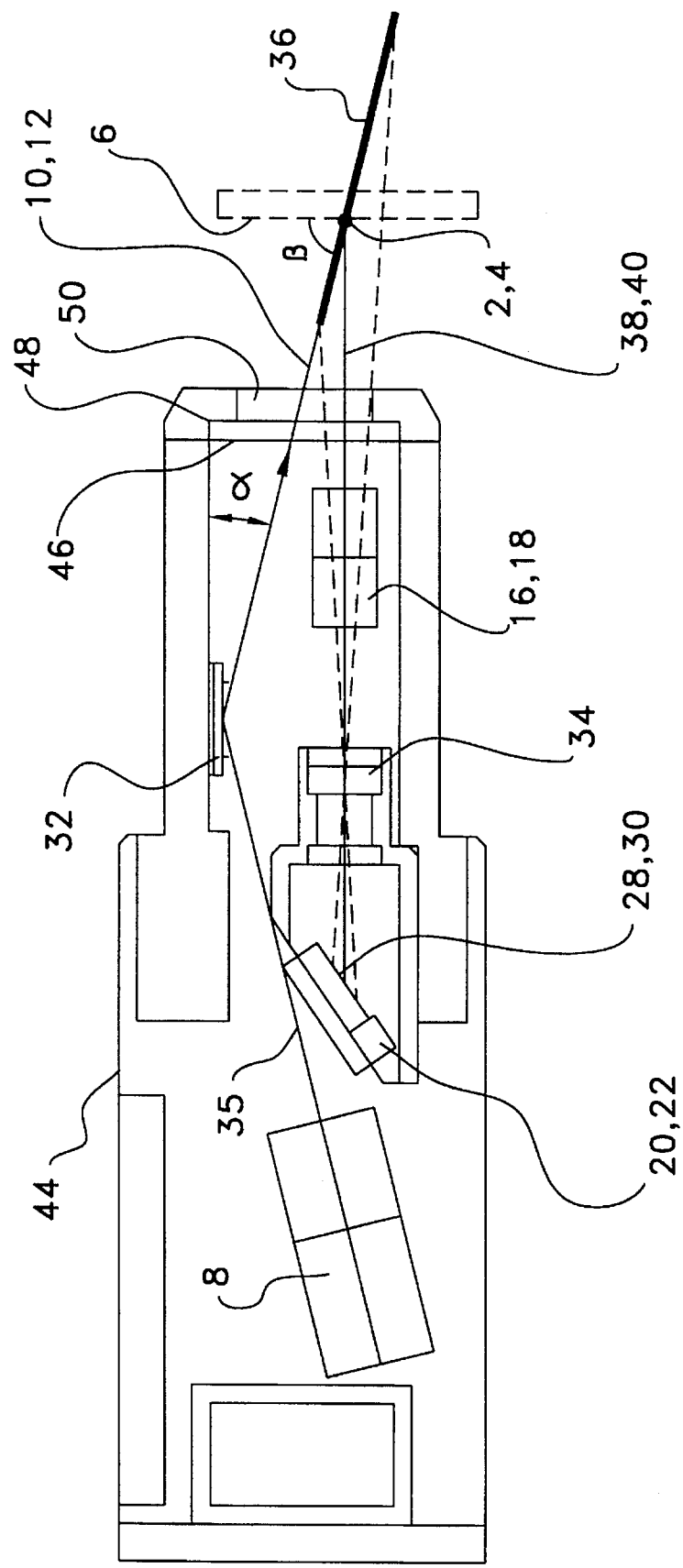

Referring to FIGS. 3 and 4, for the depth measurement, the probe uses a triangulation technique. The spreading laser beam 35 is reflected by a mirror 32 at an angle α to produce a laser line across the object surface 6, which illuminates two distinct points 2, 4 that are in the fields of view 36 of the optical sensors 20, 22. The two points 2, 4 are thus imaged on the optical sensors 20, 22 via the lens 34 and mirrors 16, 18 following the optical paths 38, 40. The mirror 32 is positioned in front of the laser source 8 and extends in a plane perpendicularly crossing the plane 14. This configuration simplifies the optical alignment of the probe. However, the sole requirement is that whatever the depth of the object surface 6 within a predetermined depth measurement range, the points 2, 4 illuminated by the laser source 8 must be in the fields of view 36 of the two optical sensors 20, 22. Therefore, instead of spreading the laser beam 35, the laser source 8 could be used to rather simply produce two light beams 10, 12 directed along the fields of view 36 of the optical sensors 20, 22 respectively, in a similar manner to the probe in FIG. 1. For a given laser power, this would increase the light intensity returned to each optical sensor 20, 22. To simplify the optical alignment, two laser diodes can be used to generate the two laser beams 10, 12, as shown in FIG. 1. Also, the light beams 10, 12 may come from different directions, e.g. one from the side of the mirror 32 and one from the side of an additional mirror (not shown in the Figs.) facing the mirror 32.

The position 28, 30 along the center line of each sensor 20, 22 where the laser light returned from the object surface 6 strikes the sensitive surface 21, 23 depends on the depth of the object surface 6 along the corresponding field of view 36. The signals produced by the sensors' outputs 25, 27 are transmitted to and processed by appropriate electronic circuits to produce two position signals proportional to the positions 28, 30 of the returned light on the sensitive surfaces 21, 23 of the sensors 20, 22. These two position signals correspond to the two depth measurements, one for each sensor 20, 22.

The main feature of the probe resides in that the position detecting system is made of two sensors 20, 22 for which the fields of view 36 are "folded" by the two parallel mirrors 16, 18 in order to obtain two crossing optical paths 38, 40 allowing the angle and depth measurement of the observed object surface 6. The two sensors 20, 22 are not parallel to each other. They are installed at an angle so that the returned light always falls on their center line. However, it is possible to use two X-Y (two axes) optical sensors instead of two linear (one axis) optical sensors. This would eliminate the need to align the sensitive surfaces 21, 23 of the two sensors 20, 22 with the optical paths along which the returned light falls on the sensors 20, 22 while the distance in front of the probe changes.

Because of the two crossing beams 10, 12, it is possible to use the probe to track joints having different dimensions by adjusting the distance from the crossing point 42, which effectively adjusts the lateral distance between the two measurement points 2, 4. The angle between the two crossing beams 10, 12 and the effective depth measurement range of the probe can be modified by the adjustment of the focal length of the lens 34 and the distance between the two sensors 20, 22. The position of the crossing point 42 can also be modified by adjusting the angle or orientation of the two mirrors 16, 18. Thus, the probe is adaptable to the distance separating the object surface 6 from the optical sensors 20, 22, and to a desired precision range.

In order to increase the noise immunity, the laser power can be modulated and the electronic circuit that processes the signals produced by the sensors 20, 22 is then provided with a band-pass filter tuned to the modulation frequency. This filtering process eliminates the noise coming from the background illumination, including the welding arc light when the probe is used in a welding process.

The probe has a housing 44 enclosing the light source 8, the two mirrors 16, 18, the lens 34 and the two optical sensors 20, 22, and all the other desired components. The housing 44 has a front window 46 facing the object surface 6, for passage of the two light beams 10, 12 emitted by the light source 8 and the incident light 38, 40 received by the mirrors 16, 18, as returned from the object surface 6. A removable front shield 48 can be installed to protect the front window 46 from the fumes and hot metal spatters produced by the welding process. This shield 48 can contain a secondary window 50 that can easily be replaced when it becomes too dirty. A protection gas can also be blown through this shield 48 to prevent the fumes from accumulating in front of the window 46.

Of course, two or more probes can be assembled in order to produce modular measurement instruments, thus increasing the size of the joints that can be tracked, or for any other measurement application.

Although the present invention has been explained hereinabove by way of preferred embodiments thereof, it should be pointed out that any modifications to these preferred embodiments, within the scope of the appended claims, are not deemed to change or alter the nature and scope of the present invention.

What is claimed is:

1. A twin sensor laser probe for absolute depth measurement of two distinct points on an object surface, comprising:

a light source means for emitting two light beams directed toward the object surface at acute angles relative thereto, to illuminate two distinct points on the object surface having positions depending on depth thereof, the light beams extending on opposite sides of a plane separating the probe in two longitudinal portions and intersecting the object surface;

two optical sensors positioned above the object surface and extending on the opposite sides of the plane respectively, each of the sensors having a photo-sensitive surface aligned to receive light derived from a corresponding one of the two illuminated points, and an output for producing a signal indicating where the light strikes on the sensitive surface;

lens means positioned between the two sensors and the object surface, for imaging the two illuminated points onto the sensitive surfaces of the sensors respectively, at positions in relation to the positions of the illuminated points on the object surface, the lens means having a focal length substantially coinciding with the object surface where the light beams are susceptible to strike thereon; and two mirrors positioned between the lens means and the object surface, and extending on the opposite sides of the plane respectively, each of the mirrors being oriented to receive the light derived from the illuminated point on the opposite side of the plane and to reflect the light towards the sensitive surface of the sensor on the opposite side of the plane via the lens means;

whereby the signals produced by the sensors provide information for the absolute depth measurement of the two points.

2. A twin sensor laser probe according to claim 1, wherein the light source means comprises a laser for producing a spreading laser beam that provides the two light beams.

3. A twin sensor laser probe according to claim 2, wherein the light source means further comprises a mirror positioned in front of the laser and extending in a plane perpendicularly crossing the plane separating the probe, the mirror of the light source means being oriented to reflect the laser beam toward the object surface.

4. A twin sensor laser probe according to claim 1, further comprising a housing enclosing the light source, the two photo-sensors, the lens means and the two mirrors, the housing having a front window facing the object surface, for passage of the two light beams emitted by the light source and the light derived from the two illuminated points that gets reflected by the mirrors.

5. A twin sensor laser probe according to claim 4, wherein the housing is provided with a removable front shield to protect the front window.

6. A probe method for absolute depth measurement of two distinct points on an object surface, comprising the steps of:

emitting two light beams directed toward the object surface at acute angles relative thereto, to illuminate two distinct points on the object surface having positions depending on depth thereof, the light beams extending on opposite sides of a plane separating an optical sensing path in two longitudinal portions and intersecting the object surface;

positioning two optical sensors above the object surface, the sensors extending on the opposite sides of the plane respectively, each of the sensors having a photo-sensitive surface aligned to receive light derived from a corresponding one of the two illuminated points, and an output for producing a signal indicating where the light strikes on the sensitive surface;

positioning lens means between the two sensors and the object surface, for imaging the two illuminated points onto the sensitive surfaces of the sensors respectively, at positions in relation to the positions of the illuminated points on the object surface, the lens means having a focal length substantially coinciding with the object surface where the light beams are susceptible to strike thereon; and positioning two mirrors between the lens means and the object surface, the mirrors extending on the opposite sides of the plane respectively, each of the mirrors being oriented to receive the light derived from the illuminated point on the opposite side of the plane and to reflect the light towards the sensitive surface of the sensor on the opposite side of the plane via the lens means;

whereby the signals produced by the sensors provide information for the absolute depth measurement of the two points.

7. A probe method according to claim 6, comprising the additional step of adjusting the focal length of the lens means, orientations of the mirrors, and orientations and positions of the sensors with respect to a distance separating the object surface from the sensitive surfaces of the sensors, and to a desired precision range thereof.

* * * * *